(12) United States Patent
Torp et al.

(10) Patent No.: US 10,724,650 B2
(45) Date of Patent: Jul. 28, 2020

(54) BALANCED REGULATING VALVE

(71) Applicant: Müller Gas Equipment A/S, Sønderborg (DK)

(72) Inventors: Hauke Torp, Handewitt (DE); Thyge Rahbæk Dueholm, Sønderborg (DK)

(73) Assignee: Müller Gas Equipment A/S, Sønderborg (DK)

( * ) Notice: Subject to any disclaimer, the term of this patent is extended or adjusted under 35 U.S.C. 154(b) by 45 days.

(21) Appl. No.: 15/781,172

(22) PCT Filed: Dec. 2, 2016

(86) PCT No.: PCT/DK2016/050410
§ 371 (c)(1),
(2) Date: Jun. 4, 2018

(87) PCT Pub. No.: WO2017/092772
PCT Pub. Date: Jun. 8, 2017

(65) Prior Publication Data
US 2018/0355998 A1 Dec. 13, 2018

(30) Foreign Application Priority Data

Dec. 4, 2015 (DK) .................................. 2015 70804

(51) Int. Cl.
*F16K 31/122* (2006.01)
*F16K 27/02* (2006.01)
(Continued)

(52) U.S. Cl.
CPC .......... *F16K 31/1221* (2013.01); *A62C 35/68* (2013.01); *F16K 27/02* (2013.01);
(Continued)

(58) Field of Classification Search
CPC .................................................. F16K 31/1226
See application file for complete search history.

(56) References Cited

U.S. PATENT DOCUMENTS

| 2001/0005005 A1 | 6/2001 | Bonomi |
| 2007/0102048 A1* | 5/2007 | Bravo ..................... F16K 1/126 |
| | | 137/495 |

(Continued)

FOREIGN PATENT DOCUMENTS

| DE | 1142938 B | 1/1963 |
| EP | 1574771 A2 | 9/2005 |

(Continued)

*Primary Examiner* — Angelisa L. Hicks
(74) *Attorney, Agent, or Firm* — James Creighton Wray

(57) ABSTRACT

The present invention concerns a balanced regulating valve (1) for regulation of a medium, such as an inert gas, where the regulating valve comprises a valve housing, composed of at least two valve housing parts, wherein there is an inlet opening (3) for an inlet pressure, and an outlet opening (4) for an outlet pressure, where furthermore there is in the valve housing an inlet opening for a pilot pressure (5), where the regulating valve furthermore comprises at least one spring element (6) and one valve piston (7) with a sealing element (8), where the valve piston, via a valve seat with a seat area (10) in a first position closes off the inlet opening, and where the inlet pressure acts on said seat area on the valve piston and in opposite direction to said spring element. What is novel about a regulating valve according to the invention is that the valve piston furthermore comprises a bore (9), such that the inlet pressure further acts through said bore on another area (11) and in the same direction as said spring element, and where said valve seat cooperating with the sealing element (8) and only one additional sealing element (12) between said valve piston and said valve housing are arranged at the inlet pressure side in the closed position.

7 Claims, 3 Drawing Sheets

(51) Int. Cl.
*G05D 16/10* (2006.01)
*G05D 16/18* (2006.01)
*A62C 35/68* (2006.01)
*F16K 39/02* (2006.01)

(52) U.S. Cl.
CPC ........ *F16K 31/1226* (2013.01); *F16K 39/022* (2013.01); *G05D 16/106* (2013.01); *G05D 16/187* (2019.01)

(56) References Cited

U.S. PATENT DOCUMENTS

| | | | | |
|---|---|---|---|---|
| 2010/0101666 | A1* | 4/2010 | Pechtold | F16K 17/30 137/505 |
| 2011/0220214 | A1 | 9/2011 | Medina | |
| 2013/0269784 | A1* | 10/2013 | Dahlgren | F16K 37/00 137/1 |

FOREIGN PATENT DOCUMENTS

| | | |
|---|---|---|
| EP | 2557344 A1 | 2/2013 |
| GB | 1221907 A | 2/1971 |
| WO | 2006087509 A1 | 8/2006 |

\* cited by examiner

BALANCED REGULATING VALVE

This application claims the benefit of Danish Application No. PA 2015 70804 filed 4 Dec. 2015 and PCT/DK2016/050410 filed 2 Dec. 2016, International Publication No. WO 2017/092772, and the amended sheets from the IPER, which are hereby incorporated by reference in their entirety as if fully set forth herein.

FIELD OF THE INVENTION

The present invention concerns a balanced regulating valve for regulation of a medium, such as an inert gas, where the regulating valve comprises a valve housing, composed of at least two valve housing parts, wherein there is an inlet opening for an inlet pressure, and an outlet opening for an outlet pressure, where furthermore there is in the valve housing an inlet opening for a pilot pressure, where the regulating valve furthermore comprises at least one spring element and one valve piston, where the valve piston, via a valve seat with a seat area, in a first position closes off the inlet opening, and where the inlet pressure acts on said seat area on the valve piston and in opposite direction to said spring element.

DESCRIPTION OF PRIOR ART

It is generally known how to employ gases of different types, such as inert gases, in connection with the extinguishing of fire. The effect typically occurs in that oxygen is driven out from the area, so that the fire is so to speak smothered and dies. Furthermore, certain types of gas react chemically with oxygen and/or smoke gases in the room, while still other types of gases have a reducing effect on the flame temperature, so that the flames are extinguished.

Optionally it is possible to use media or gases such as carbon dioxide, argon or nitrogen or a mixture thereof which is suitable in terms of properties, for example, so that electronic equipment is not affected and/or needlessly damaged. Other types of gases could also be used, as long as they do not feed the fire. Especially in server rooms and other rooms with IT equipment these methods and systems for fire extinguishing are used.

A system typically includes pressurized bottles with are interconnected with each other and provided with a regulating valve, which upon activation discharges either the entire quantity of gas in the pressurized bottles or a portion thereof, via a pipe system and via a number of nozzles in the room or rooms. The system can be disposed in the actual room, but often it will be placed in an accessible location outside of the actual room or rooms, where the fire extinguishing system will operate.

When speaking of a safety system it is of greatest importance that the system be reliable, and that it operates as intended in connection with a fire which has occurred. Many of the known solutions employ a pilot pressure to activate one or more regulating valves in connection with a fire. This pilot pressure is typically supplied from a pressurized bottle in the system or from an outside pressure source. Other systems can be designed to be activated without pilot pressure, and furthermore the activation can be based on input from one or more sensors, or manually.

What is common to the known regulating valves for such applications is that they are often quite bulky and designed with many seals, typically in the form of O-rings, especially in the high pressure part. This increases the risk of leakage, and also increases the friction which needs to be overcome during activation and use. This increased friction means a more nonuniform regulation, since the friction means that the valve will "jump" between the different positions on account of the need to detach the valve piston from the current position. In order to accomplish a uniform regulation, the known valves are often designed with larger valve pistons, so that larger areas and thus larger forces can be achieved. In this way, an attempt is made to compensate for the influence of friction, but the increased risk of leakage remains unchanged.

From EP 2557344 A1 there is known an example of a balanced regulating valve for regulating of a medium, where the regulating valve comprises a valve housing with an inlet opening for an inlet pressure, and an outlet opening for an outlet pressure, where the regulating valve furthermore comprises a valve piston which, via a valve seat with a seat area, in a first position closes off the inlet opening and where the valve piston furthermore comprises a bore, such that the inlet pressure further acts through the bore on another area opposite the seat area.

US 2001/0005005 A discloses a valve for regulation of a medium, such as an inert gas, where the valve comprises a valve housing, composed of at least two valve housing parts, wherein there is an inlet opening for an inlet pressure, and an outlet opening for an outlet pressure, where furthermore there is in the valve housing an inlet opening for a pilot pressure, where the valve furthermore comprises at least one spring element and one valve piston moveable between a closed and an open position. The inlet pressure acts on said seat area on the valve piston.

Therefore, there is a great need for a solution which can live up to the current demands for reliability and which at the same time is dependable and effective. Such a solution will advantageously be smaller, and designed such that it can be protected under a standardized protective cap when it is mounted on a pressurized bottle.

One purpose of the invention is to indicate a dependable and effective balanced regulating valve, where the regulating valve is compact and comprises a minimum of seals at the high pressure side, and a connection for a pilot pressure for activation and control of the regulating valve's outlet pressure.

DESCRIPTION OF THE INVENTION

As mentioned at the outset, the present invention concerns a balanced regulating valve for regulation of a medium, such as an inert gas, where the regulating valve comprises a valve housing, composed of at least two valve housing parts, wherein there is an inlet opening for an inlet pressure, and an outlet opening for an outlet pressure, where furthermore there is in the valve housing an inlet opening for a pilot pressure, where the regulating valve furthermore comprises at least one spring element and one valve piston moveable between a closed and an open position, where the valve piston, via a valve seat with a seat area, in the closed position closes off the inlet opening, and where the inlet pressure acts on said seat area on the valve piston and in opposite direction to said spring element.

The valve piston furthermore comprises a bore, such that the inlet pressure further acts through said bore on another area and in the same direction as said spring element, and where said valve seat and only one additional sealing element between said valve piston and said valve housing are arranged at the inlet pressure side. The valve piston further comprises a third ring formed area on which the outlet pressure acts on the valve piston.

Hereby, the outlet pressure thus counteracts the pilot pressure and in this way the outlet pressure leaving the outlet opening is regulated.

By the term sealing element is meant a seal which can be composed of a plurality of component parts, such as a resilient O-ring and a thrust ring of PTFE, yet the sealing element always acts as a single independent seal.

In the present invention, the forces from the inlet pressure on the regulating piston will be approximately in balance, since the forces which the inlet pressure produces on the first area will be approximately canceled out by the forces which the inlet pressure produces on the other area. Thus, since the inlet pressure has substantially less influence on the regulating piston, a more uniform regulation is achieved when the pressurized bottles from which the medium is discharged are emptied and thus the inlet pressure drops. Furthermore, the spring in principle is only needed to make sure that the regulating valve is in a particular position, namely closed when the valve is pressure-less. Thus, the spring can typically be chosen to have a smaller dimension.

In one variant of a balanced regulating valve according to the invention the two approximately identical areas can have a difference with respect to each other on the order of magnitude of around 0.7 to 1.3. In this way, an even smaller dimension of the regulating valve is achieved.

Another significant advantage is that the high pressure side of the regulating valve can be designed with only one gasket or seal, typically in the form of an O-ring with a small diameter at the high pressure side. The advantage of this is that there is much less friction in the regulating valve. The fewest possible and the smallest possible O-rings means less friction in the valve and also less risk of leakage, since there are fewer potential leakage sites. Moreover, a regulating valve according to the invention has a sealing screw which secures a seat seal in the valve piston. In this way, it becomes possible to replace the seat seal as needed.

In a preferred variant of a balanced regulating valve according to the invention the mentioned inlet opening for a pilot pressure can be directly or indirectly connected to the same medium, pressurized bottle, or bank of pressurized bottles as are connected to the regulating valve's inlet opening for an inlet pressure. Thus, the pilot pressure comes from the bottle or from connected bottles in a bank and not from an outside pressure source, which means a greater dependability, and also the system becomes more simple and cheap.

A preferred variant of a balanced regulating valve according to the invention has the pilot pressure regulated by a regulating mechanism, where the regulating mechanism comprises one or more regulating stages, for example, a 1-stage or a 2-stage regulator, where said regulating mechanism is designed to put out an approximately constant pilot pressure, independently of said regulating mechanism's inlet pressure. With such a 1-stage or 2-stage regulator the pilot pressure can remain constant even when a pressurized bottle is filled with a medium with a pressure of 300 bar, for example, and also when the pressurized bottle is almost empty at 10 bar, for example. In order to achieve a constant outlet pressure from the balanced regulating valve, a constant pilot pressure is required.

In one variant of a balanced regulating valve according to the invention the regulated pilot pressure can be, for example, less than 0.05 times the maximum pressure in the medium, pressurized bottle, or bank of pressurized bottles that are connected to the regulating valve.

In yet another variant of a balanced regulating valve according to the invention the regulating valve can comprise manual activation means, for example, a simple operating handle. In this way it is possible to perform a manual operation of the equipment on hand, which may be necessary for example upon failure of the electrical activation means.

In one variant of a balanced regulating valve according to the invention the regulating valve can comprise electrical activation means, where the electrical activation means comprise one or more sensors. In this way, it is possible to trigger a fire fighting, for example, by means of signals from a sensor, such as a sensor which is sensitive to smoke or heat. Yet it may be expected that most installations by far will contain manual activation means.

In one variant according to the invention said activation means can be designed to trigger a plurality of balanced regulating valves all at once. This is accomplished by connecting an electrical and/or manual activation means to the inlet opening for pilot pressure on a plurality of balanced regulating valves. Upon performing a triggering of said activation means, a plurality of regulating valves on a plurality of pressurized bottles or banks of pressurized bottles can be activated at the same time, so that a fire is brought quickly and safely under control.

BRIEF DESCRIPTION OF THE DRAWINGS

One possible variant of the invention is described below more closely with regard to the accompanying drawings.

In the description of the figures, identical or corresponding elements will be designated with the same references in the different figures. Thus, it will not be necessary to provide an explanation of all details in connection with each figure or embodiment.

DETAILED DESCRIPTION OF THE INVENTION

Figure 1:
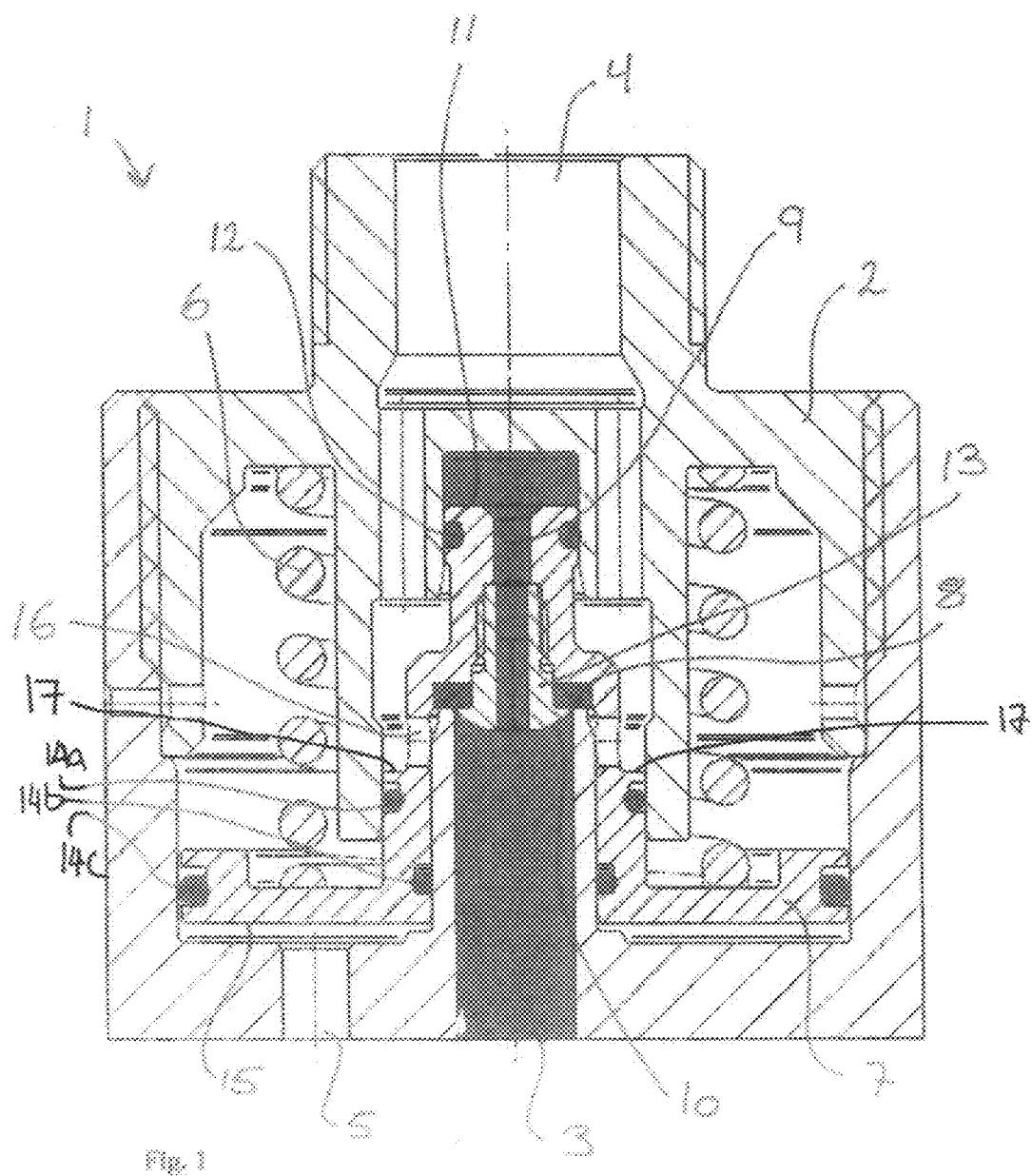
FIG. 1 shows a cross section of a balanced regulating valve, being closed.

FIG. 1 shows a cross section of a balanced regulating valve 1, which is closed, as illustrated by the gray coloration in parts of the valve. The regulating valve 1 comprises a valve housing 2, the valve housing 2 having an inlet opening 3 for an inlet pressure, an outlet opening 4 for an outlet pressure and an inlet opening 5 for a pilot pressure. Furthermore, the regulating valve 1 comprises a spring element 6, acting between the valve housing 2 itself and a valve piston 7, where the valve piston 7 comprises a seat seal 8, which together with the valve housing 2 forms the actual valve seat. In the valve piston 7 there is arranged a bore 9 and, as an extension of this bore 9, there is mounted a sealing screw 13, which secures the interchangeable seat seal 8 to the valve piston 7. In the event that the seat seal 8 is to be changed, the valve housing 2 will be separated, being composed of at least two valve housing parts. After this, the sealing screw 13 is removed so that the seat seal 8 can be replaced.

The valve piston 7 is provided with only one further seal 12 on the parts of the valve piston 7 that are affected by the inlet pressure, which will often be as high as 300 bar, so that it is advantageous to have only one seal 12, whereby less friction is achieved between the respective parts. Further seals 14*ac*, 14*b* and 14*c* are arranged on the parts of the valve piston 7 subjected only to the outlet pressure. The outlet pressure acts on a third ring formed area 17 on the valve piston, allowing the valve piston to regulate the outlet pressure.

As emerges from the figure, the medium acts on a first area 10 and on a second area 11 on the valve piston 7, the medium being distributed via the bore 9 and the sealing screw 13. The two areas 10, 11 have a modest difference in size and the regulating valve 1 is in this way balanced and held in a particular position of the spring element 6. Upon activation of the valve, a pilot pressure is supplied to the inlet opening 5, whereupon the valve piston is acted upon at an area 15, and thus offsets the force stemming from the inlet pressure and from the spring element 6.

Figure 2:
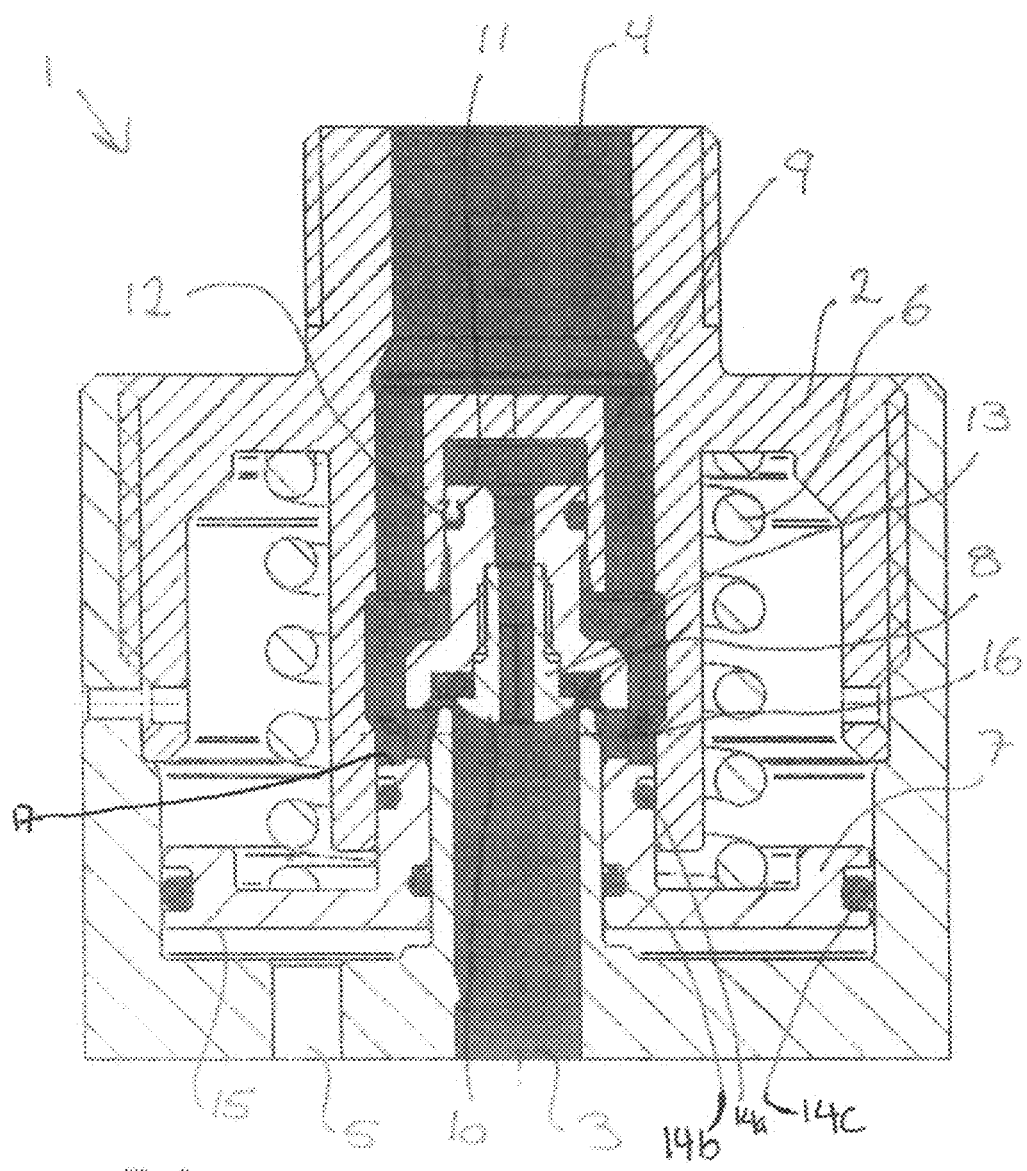
FIG. 2 shows a cross section of a balanced regulating valve, being open.

FIG. 2 shows a cross section of a balanced regulating valve 1, which is open, a pilot pressure being supplied via the inlet opening 5 for pilot pressure. The medium is now allowed to flow across the valve seat and through openings 16 in the sides of the valve piston and out through the outlet opening 4 in the valve housing 2. Since the regulating valve is balanced, only a very modest pilot pressure is needed for the activation. The magnitude of the outlet pressure is determined by the magnitude of the pilot pressure, while the pilot pressure is relatively much less than the outlet pressure. The balanced regulating valve can thus be used for different outlet pressures simply by changing the pilot pressure.

Figure 3:
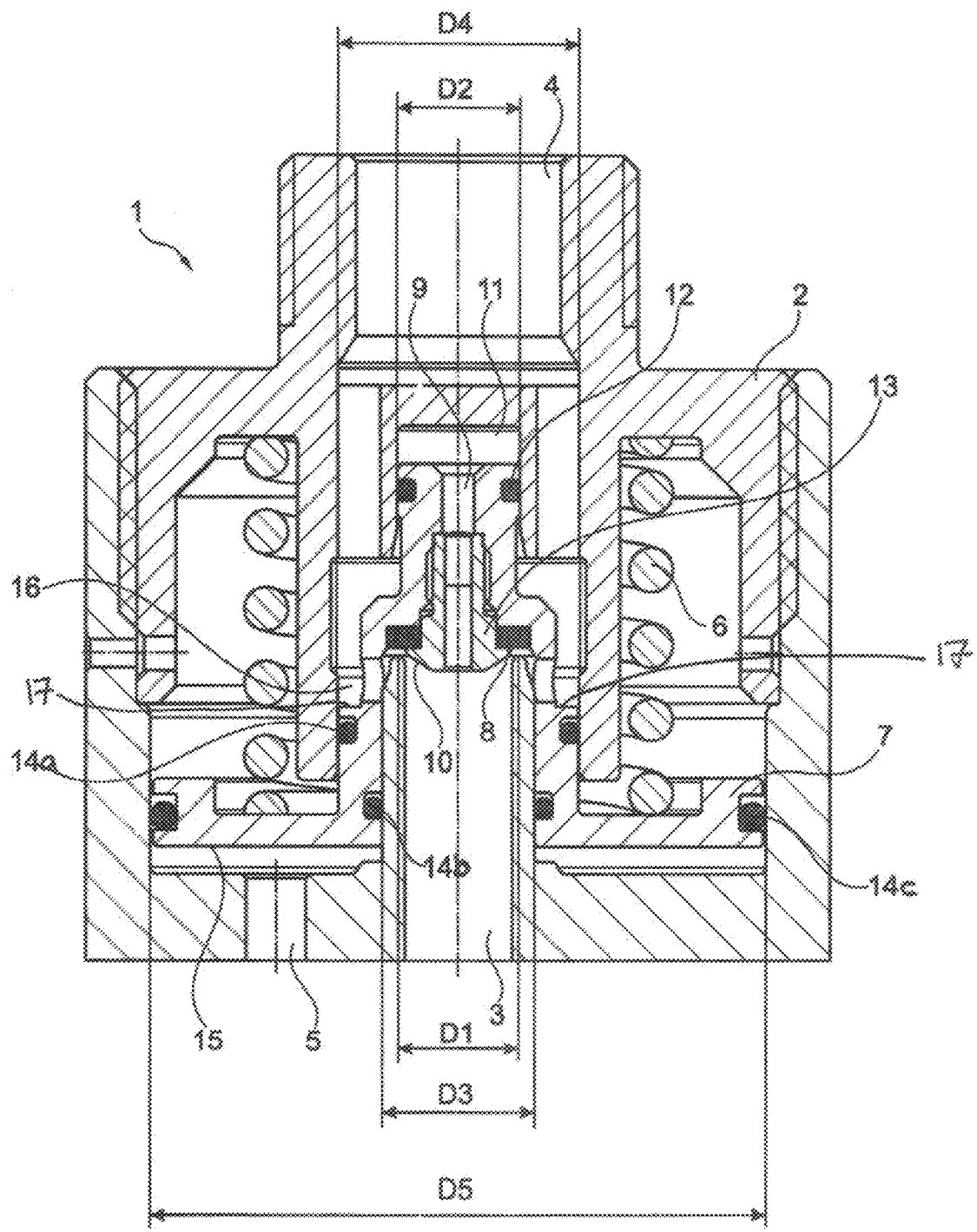
FIG. 3 shows a cross section of a balanced regulating valve, illustrating the respective diameters.

FIG. 3 shows a cross section of a balanced regulating valve, illustrating the respective diameters. When the regulating valve is closed, the pressure from the medium acts on the areas formed by D1 and D2. Since the two diameters are approximately the same size—or have a slight difference—a kind of equilibrium or a very modest preponderance for one of the sides is established. If D1 is larger than D2, the inlet pressure will act on the valve piston 7 in opposite direction to the force of the spring element 6, while the converse is true if D1 is smaller than D2. The spring element 6 is dimensioned in relation to D1 and D2, so that a preferred pilot pressure is necessary in order to activate the regulating valve 1. The pilot pressure acts on the ring area formed by D5 and D3. When the regulating valve 1 is open, the outlet pressure acts on the ring area formed by D4 and D3 and to a lesser extent by D2 and D1. The outlet pressure thus counteracts the pilot pressure and in this way the outlet pressure leaving the outlet opening 4 is regulated.

In the variant shown of a balanced regulating valve according to the invention, the emphasis has been placed on indicating the invention in a way as simple and clear as possible, so that a skilled person will be able to create corresponding balanced regulating valves which appear different, yet still lie within the scope of protection of the invention, as indicated in the following patent claims.

The invention claimed is:

1. A balanced regulating valve for regulation of a medium, such as an inert gas, where the regulating valve comprises a valve housing, composed of at least two valve housing parts, wherein there is an inlet opening for an inlet pressure, and an outlet opening for an outlet pressure, where furthermore there is in the valve housing an inlet opening for a pilot pressure, where the regulating valve furthermore comprises at least one spring element and one valve piston movable between a closed and an open position, where the valve piston, via a valve seat with a seat area, in the closed position closes off the inlet opening, and where the inlet pressure acts on said seat area on the valve piston and in opposite direction to said spring element, wherein the valve piston furthermore comprises a seat seal and a bore, such that the inlet pressure further acts through said bore on a second area on the valve piston and in the same direction as said spring element, and where said valve seat and only one additional sealing element between said valve piston and said valve housing are arranged at the inlet pressure side, wherein the valve piston further comprises a third ring formed area on which the outlet pressure acts on the valve piston.

2. A balanced regulating valve according to claim 1, wherein said inlet opening for a pilot pressure is directly or indirectly connected to the same medium as provided to the inlet opening of the balanced regulating valve.

3. A balanced regulating valve according to claim 1, wherein the pilot pressure is regulated by a separate regulating mechanism, where said balanced regulating valve receives an approximately constant pilot pressure, independently of said regulating mechanism's inlet pressure.

4. A balanced regulating valve according to claim 1, wherein the balanced regulating valve is connected to a manual activation means, a simple operating handle.

5. A balanced regulating valve according to claim 4, wherein said activation means is designed to trigger a plurality of balanced regulating valves all at once.

6. A balanced regulating valve according to claim 1, wherein the balanced regulating valve is connected to electrical activation means, where the electrical activation means comprise one or more sensors.

7. A balanced regulating valve according to claim 1, wherein the size ratio between the first and the second area is between 0.7 and 1.3.

* * * * *